United States Patent
Hagan et al.

(10) Patent No.: US 9,477,555 B1
(45) Date of Patent: Oct. 25, 2016

(54) OPTIMIZED DISASTER-RECOVERY-AS-A-SERVICE SYSTEM

(71) Applicant: INTERNATIONAL BUSINESS MACHINES CORPORATION, Armonk, NY (US)

(72) Inventors: Tom Hagan, Tampa, FL (US); Robin H Lewis, Warwick (GB); Jeff N Marinstein, Stamford, CT (US); Ramani Ranjan Routray, San Jose, CA (US); Yang Song, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/942,483

(22) Filed: Nov. 16, 2015

(51) Int. Cl.
*G06F 11/14* (2006.01)
*G06F 17/30* (2006.01)
*H04L 12/927* (2013.01)
(Continued)

(52) U.S. Cl.
CPC ....... *G06F 11/1464* (2013.01); *G06F 9/45558* (2013.01); *G06F 11/1402* (2013.01); *G06F 11/1446* (2013.01); *G06F 11/1448* (2013.01); *G06F 11/1471* (2013.01); *G06F 11/2066* (2013.01); *G06F 11/3628* (2013.01); *G06F 17/30336* (2013.01); *G06F 17/30442* (2013.01); *G06F 17/30463* (2013.01); *G06F 17/30575* (2013.01); *G06F 17/30935* (2013.01); *H04L 47/805* (2013.01); *H04L 63/145* (2013.01);

(Continued)

(58) Field of Classification Search
CPC .......... G06F 11/0793; G06F 9/45533; G06F 11/1402; G06F 11/3006; G06F 11/3034; G06F 11/3079; G06F 2009/4557; G06F 11/3628; G06F 11/1471; G06F 11/1446; G06F 11/1448; G06F 11/1458; G06F 11/2066
See application file for complete search history.

(56) References Cited

U.S. PATENT DOCUMENTS 7,725,441 B2 *  5/2010  Balasubramanian ... G06F 11/20
    707/675
7,861,111 B2    12/2010  Doerr
(Continued)

OTHER PUBLICATIONS

Mohammad Ali Khoshkholghi et al., "Disaster Recovery in Cloud Computing: A Survey", Computer and Information Science; vol. 7, No. 4; 2014, pp. 39-54.*

(Continued)

*Primary Examiner* — Srirama Channavajjala
(74) *Attorney, Agent, or Firm* — Matthew Chung, Esq.; Hye Jin Lucy Song, Esq.; Heslin Rothenberg Farley & Mesiti PC

(57) ABSTRACT

Methods, computer program products, and systems are presented. The methods include, for instance: enabling a client of a source site protected by a disaster recovery service, to select one or more value-added service to be performed by a data protection service provider in addition to the disaster recovery service. Respective dataset associated with a service is identified and analyzed to minimize the amount of dataset to replicate from the source site to a target site run by the data protection service provider, and a policy dictating when and how to replicate which dataset is configured. Upon being triggered, the data protection service provider performs the service by use of the dataset at the target site, the dataset either replicated according to the policy from the source site or being reconstructed from the transferred dataset when necessary.

20 Claims, 5 Drawing Sheets

(51) Int. Cl.
  *G06F 9/455* (2006.01)
  *H04L 29/06* (2006.01)
  *G06F 11/36* (2006.01)
  *G06F 11/20* (2006.01)

(52) U.S. Cl.
  CPC .............. *G06F 2009/45583* (2013.01); *G06F 2009/45591* (2013.01); *G06F 2201/84* (2013.01)

(56) References Cited

U.S. PATENT DOCUMENTS

| | | | |
|---|---|---|---|
| 7,945,537 B2* | 5/2011 | Balasubramanian | ... G06F 11/20 707/675 |
| 7,992,031 B2* | 8/2011 | Chavda | ............... G06F 11/0793 714/1 |
| 8,712,959 B1 | 4/2014 | Lim et al. | |
| 9,208,006 B2* | 12/2015 | Jones | ..................... G06F 11/008 |
| 2003/0188114 A1* | 10/2003 | Lubbers | .............. G06F 11/2058 711/162 |
| 2004/0039888 A1* | 2/2004 | LeCrone | ............ G06F 11/2076 711/162 |
| 2005/0193245 A1* | 9/2005 | Hayden | ............... G06F 11/2069 714/13 |
| 2005/0262097 A1* | 11/2005 | Sim-Tang | ......... G06F 17/30085 |
| 2006/0074993 A1* | 4/2006 | Pulamarasetti | ..... G06F 11/1458 |
| 2006/0129562 A1* | 6/2006 | Pulamarasetti | ... G06F 17/30008 |
| 2007/0043581 A1* | 2/2007 | Chouanard | ............ G06Q 40/04 705/1.1 |
| 2008/0209142 A1* | 8/2008 | Obernuefemann | . G06F 11/1456 711/161 |
| 2011/0113466 A1* | 5/2011 | Stringham | ........ G06F 17/30864 726/1 |
| 2011/0191296 A1* | 8/2011 | Wall | .................. G06F 17/30088 707/639 |
| 2012/0124307 A1* | 5/2012 | Ashutosh | ............ G06F 11/1451 711/162 |
| 2012/0137173 A1* | 5/2012 | Burshan | .............. G06F 9/45533 714/15 |
| 2012/0203742 A1* | 8/2012 | Goodman | ........... G06F 11/1469 707/646 |
| 2013/0263122 A1* | 10/2013 | Levijarvi | ............ G06F 11/1415 718/1 |
| 2014/0040206 A1 | 2/2014 | Ramakrishnan et al. | |
| 2014/0047264 A1* | 2/2014 | Wang | .................... G06F 11/143 714/4.11 |
| 2014/0298092 A1* | 10/2014 | Boldo | ................. G06F 11/1471 714/20 |
| 2015/0143162 A1 | 5/2015 | Wang et al. | |
| 2015/0227602 A1* | 8/2015 | Ramu | ............... G06F 17/30575 707/634 |

OTHER PUBLICATIONS

Mahajan, S. et al.; Service Level Agreement Driven Disaster; An IP.com Prior Art Database Technical Disclosure May 6, 2013.

Dash, P. et al.; Using I/O Shipping to Maximize Availability, Optimize Error Handling and Detach Policies, and Maintain High Availability and Disaster Recovery Readiness; An IP.com Prior Art Database Technical Disclosure Jul. 3, 2013.

Mel, Peter; Grance, Timothy; The NIST Definition of Cloud Computing; NIST Special Publication 800-145; Sep. 2011.

* cited by examiner

OPTIMIZED DISASTER-RECOVERY-AS-A-SERVICE SYSTEM

TECHNICAL FIELD

The present disclosure relates to data protection and redundancy service, and more particularly to methods, computer program products, and systems for optimized Disaster-Recovery-as-a-Service (DRaaS) system by use of selective data transfer.

BACKGROUND

A data center is a facility that centralizes IT operations and equipment of an organization to store, to manage and to service data within the organization, and/or users outside of the organization. Because data centers are critical in modern IT environment, users of data centers demand reliable operations and continuous data accessibility from the data centers in all circumstances. Consequently, most data centers put efforts to fail-safe their facilities at reasonable cost, and data protection services are commercially available for such data centers.

SUMMARY

The shortcomings of the prior art are overcome, and additional advantages are provided, through the provision, in one aspect, of a method. The method for optimizing a data protection service provider includes: obtaining, by the data protection service provider running on a computer of a targeting site, at least one value-added service selected by use of a client agent running on another computer of a source site, for the data protection service provider to provide additional to a disaster recovery service for the source site, wherein the source site is a client data center originating client data being protected by the data protection service provider at the target site; identifying, by the data protection service provider, a first dataset comprising components from the client data of the source site, the first dataset being associated with a first service provided by the target site, the first service being in a group comprising the obtained at least one value-added service and the disaster recovery service; analyzing, by the data protection service provider, the identified first dataset such that the data protection service provider is enabled to determine a policy corresponding to the first service, the policy dictating when and how to replicate the components of the identified first dataset from the source site to the target site in order to minimize cost of providing the first service for the source site, wherein the cost comprises network bandwidth and storage footprint, the network bandwidth being to replicate the identified first dataset from the source site to the target site, and the storage footprint being to maintain the identified first dataset in the target site; upon detecting inputs enabling the first service, replicating, by the data protection service provider, from the source site to the target site, the components of the identified first dataset according to the policy determined from said analyzing; and performing, by the data protection service provider, the first service in the target site based on the replicated components of the first dataset.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
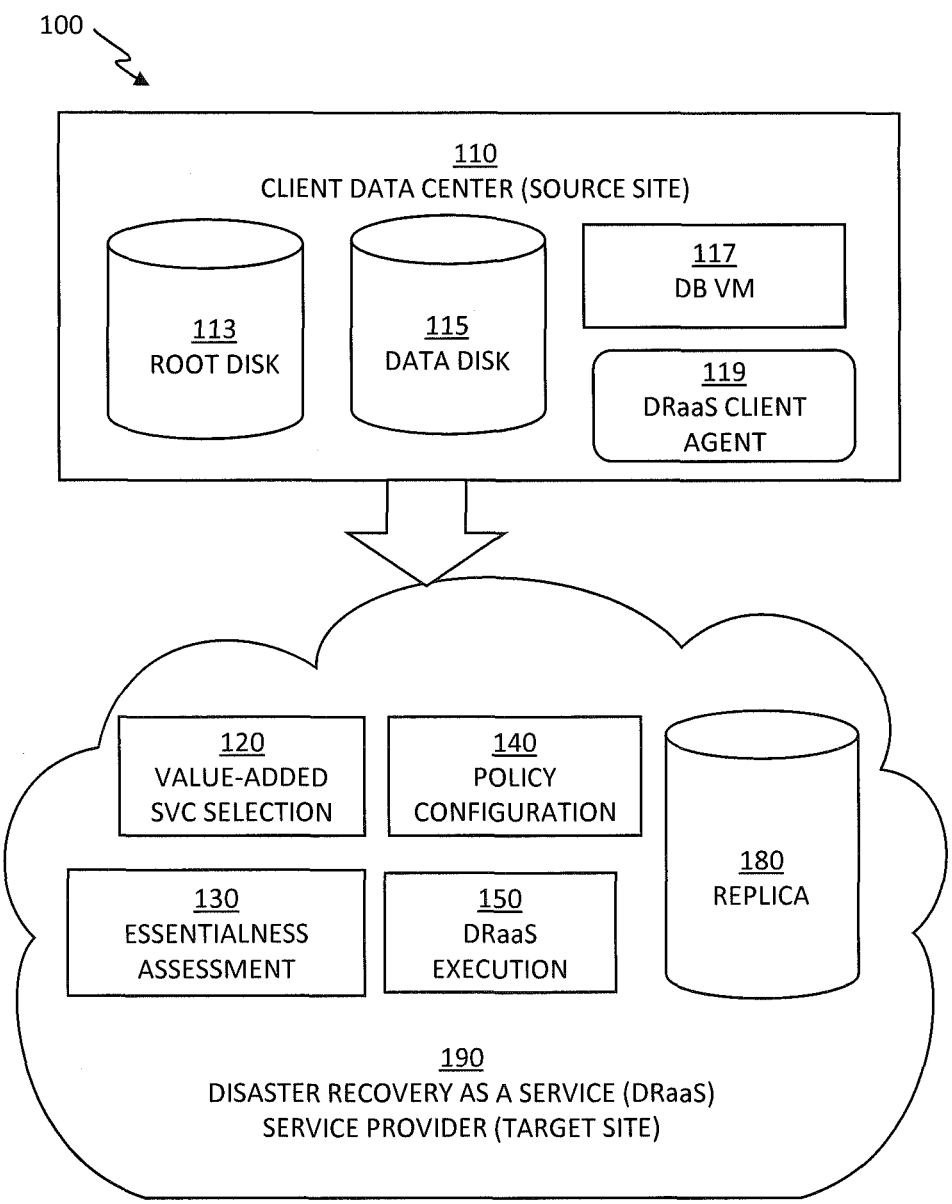
FIG. 1 depicts an optimized Disaster-Recovery-as-a-Service (DRaaS) system by use of selective data transfer, in accordance with one or more embodiments set forth herein.

FIG. 1 depicts an optimized Disaster-Recovery-as-a-Service (DRaaS) system 100 by use of selective data transfer, in accordance with one or more embodiments set forth herein.

The optimized DRaaS system 100 includes a client data center 110 and a Disaster-Recovery-as-a-Service (DRaaS) service provider 190. The client data center 110 is a data center of a client that provides IT operation and data services to end users, privately within an organization and/or publicly over a public network. In this specification, term "source site" is used to indicate that the client data center 110 originates client data subject to a data protection and other services as provided by the DRaaS service provider 190. The term source site may be used interchangeably with term "source zone", in contrast with terms "target site" or "landing zone" indicating the DRaaS service provider 190.

The client data center 110 includes a root disk 113, a data disk 115, a database virtual machine (DB VM) 117, and a DRaaS client agent 119. In one embodiment of the present invention, the DRaaS client agent 119 running in the client data center 110 records changes of the client data on the root disk 113 and the data disk 115 to be duplicated on the DRaaS service provider 190 for continuous data protection. The changes of the client data results from input/output requests and disk file changes on the root disk 113 and the data disk 115, as the client data center 110 services end users. In another embodiment of the present invention, the DRaaS client agent 119 interacts with the client to collect information on which value-added services are selected by the client to be serviced on the target site by the DRaaS service provider 190, as well as a demand by the client for data protection in preparation for a specific occasion, such as an impending storm.

The DRaaS service provider 190 is a remote data center referred to as a target site that is distinctive from the client data center 110. The DRaaS service provider 190 includes a value-added service selection module 120, an essentialness assessment module 130, a policy configuration module 140, a DRaaS execution module 150, and a replica 180. The DRaaS service provider 190 optimizes traditional disaster recovery service by analyzing the client data and selectively transferring the client data to the target site based on the analysis. The DRaaS service provider 190 also provides one or more value-added service as selected by the client.

The DRaaS service provider 190 provides DRaaS services including continuous/on-demand data protection service as well as value-added services according to requests of a client operating the client data center 110. To provide a data protection service to the client, the DRaaS service provider 190 replicates components of the client data center 110 as set forth herein and maintains the replica 180 in the DRaaS service provider 190. The DRaaS service provider 190 minimizes the amount of data to be transferred from the client data center 110 by use of the value-added service selection module 120, the essentialness assessment module 130, and the policy configuration module 140 such that the DRaaS service provider 190 reduces cost on network bandwidth for transferring the client data to the target site as well as cost on storage footprint to maintain the client data at the target site. Minimal data transfer is particularly beneficial when the target site services numerous clients with very large volumes of data to be protected, wherein resource of the target site is a bottleneck.

The value-added service selection module 120 enables the client to select, via the DRaaS client agent 119, from a group of value-added services provided by the DRaaS service provider 190, a service that may be performed on the replica 180 to benefit the client data center 110. Term "value-added service" is used to indicate a service additional to disaster recovery test and/or restoration, which is provided by the DRaaS service provider 190. Examples of value-added services may be, but are not limited to, virus scan, eDiscovery, compressibility estimation, etc.

A dataset of the client data center 110 to be duplicated into the replica 180 may be determined based on a type of value-added service as selected by the client. For example, the DRaaS service provider 190 may provide a virus scanning service on the replica 180 by creating a virtual environment identical to the client data center 110 on the DRaaS service provider 190, attaching the replica 180, and running an anti-virus software. Because the client may save computational cost to perform the virus scan and a license fee for the anti-virus software, the client data center 110 benefits from choosing to have the DRaaS service provider 190 virus scan the replica 180. Further examples of value-added services may include, but are not limited to, growth rate estimation, anomaly detection, and compressibility estimation, etc.

The essentialness assessment module 130 analyzes IT characteristics of components 113, 115, and 117 of the client data center 110 and assesses the degree of essentialness, represented by an "essentialness score", of each component prior to transfer to the target site. Examples of IT components in the client data center 110 may be, but are not limited to, virtual machines, storage volumes, application programs, etc.

The policy configuration module 140 facilitates the client and/or an administrator of the DRaaS service provider 190 to configure how to administer the data protection and value-added services such as when to transfer which data to the target site, according to respective essentialness score of components 113, 115, and 117 of the client data center 110.

The DRaaS execution module 150 performs the data protection services according to a backup policy set by the policy configuration module 140. The protection may be a continuous process or a batch process on-demand triggered by a forecasted disastrous event, a request from the client, etc.

The replica 180 includes only portion of the IT component from the client data center 110, as transferred pursuant to the essentialness score assessed by the essentialness assessment module 130 and a policy set by the policy configuration module 140.

The DRaaS service provider 190 may simultaneously employ other conventional optimization techniques to minimize resource consumption/cost. For example, in order to further reduce the storage footprint, the DRaaS service provider 190 may use compression, thin-provisioning, and/or deduplication methods along with the analysis and selective transfer of data. Similarly, in order to further reduce network bandwidth usage and time/volume of data transfer, the DRaaS service provider 190 may also use techniques such as deduplication, compression, optimized network protocols, etc.

Figure 2:
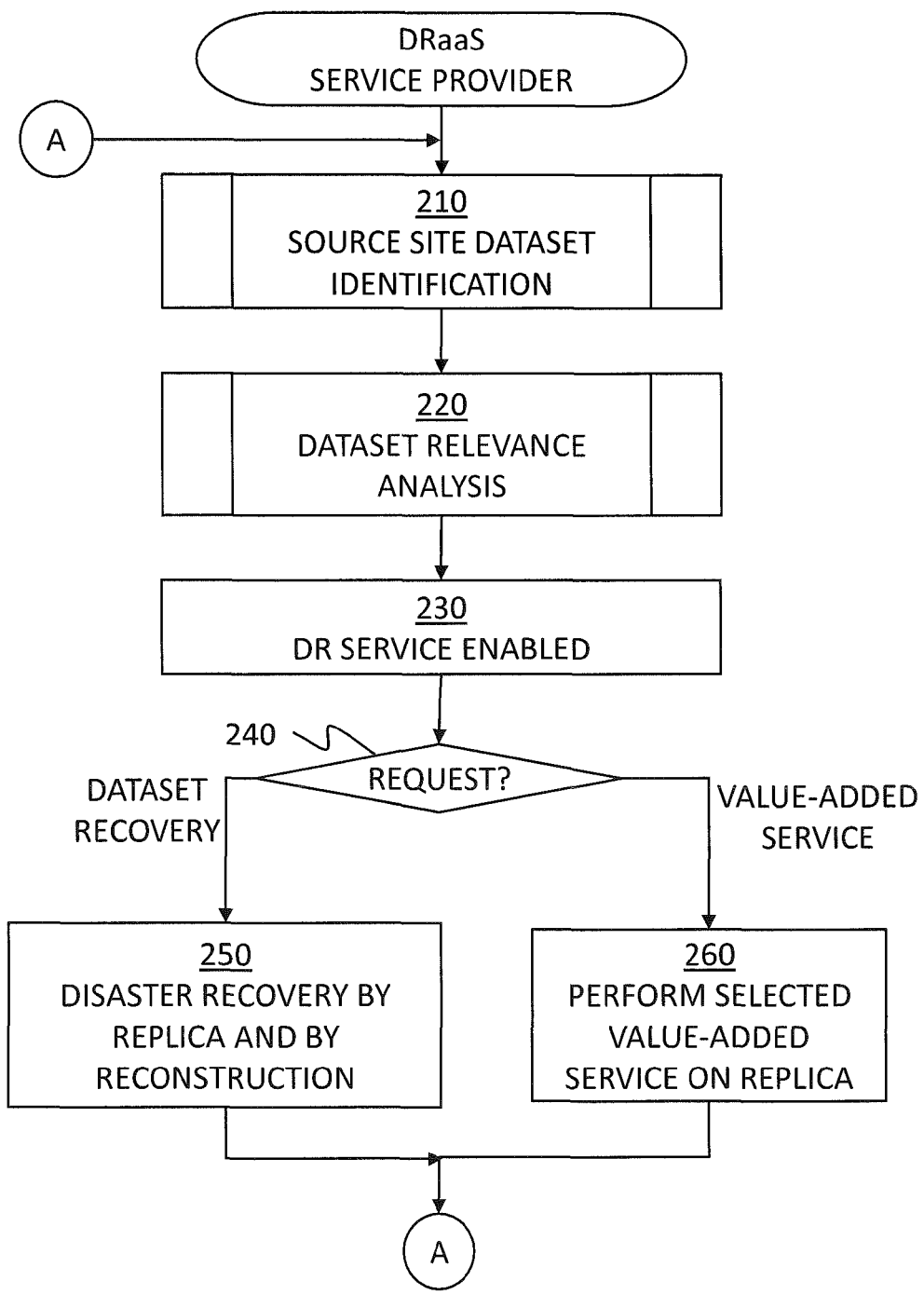
FIG. 2 depicts a flowchart for the DRaaS service provider of the optimized DRaaS system, in accordance with one or more embodiments set forth herein.

FIG. 2 depicts a flowchart for the DRaaS service provider 190 of the optimized DRaaS system 100 of FIG. 1, in accordance with one or more embodiments set forth herein.

In block 210, the DRaaS service provider 190 identifies which dataset is subject to disaster recovery service and selected value-added service, hereinafter DR/VA services, if any, provided by the DRaaS service provider 190, by use of the value-added service selection module 120. As a prerequisite, the DRaaS service provider 190 has information as to the services selected for the client data center by use of the DRaaS client agent 119. Then the DRaaS service provider 190 proceeds with block 220.

In block 220, the DRaaS service provider 190 analyzes how the dataset identified in block 210 is relevant to the respective DR/VA services, by use of the essentialness assessment module 130 and the policy configuration module 140. Then the DRaaS service provider 190 proceeds with block 230.

In one embodiment of the present invention, the database virtual machine (DB VM) 117 of the client data center 110 includes three storage volumes respectively serve as a data volume, a log volume, and an index volume. Traditional data redundancy/protection solutions duplicate all three volumes as well as a VM disk data to the target site, by use of a software agent such as IBM® Softek. (IBM is a registered trademarks of International Business Machines Corporation, Armonk, N.Y., USA.) Contrastingly, the essentialness assessment module 130 of the DRaaS service provider 190 takes cost-effectiveness into account and gives the index volume a very low essentialness score, or classifies the index volume as Non-essential, because indices in the index volume may be reconstructed from the data volume and the log volume. As the index volume can be reconstructed, the index volume may be transferred in a delayed fashion, or not to be transferred at all and reconstructed using the transferred data volume and the log volume when the client demands a recovery service to be performed.

The essentialness score is determined by the relative importance of a dataset in context of a specific service selected from the DR/VA services available from the DRaaS service provider 190. Accordingly, each service of the available DR/VA services has respective essentialness definition or a standard for dataset assessment. The same type of dataset may be essential for one service, but may not be essential for another service. Seen from example above, the index volume is not essential in context of the disaster recovery service, because the index volume may be reconstructed at the target site. The index volume is not essential in context of compressibility estimation value-added service, because the index volume may not be transferred at all, so the compression ratio of the index volume is not essential.

On the other hand, the index volume is just as essential as other two volumes in context of anti-virus scanning value-added service, because the actual index volume of the client data center, not a substitute index volume that had been reconstructed at the target site, needs to be scanned and, accordingly, the index volume needs to be transferred.

In one embodiment of the present invention, the essentialness assessment module 130 assigns an essentialness score to an IT component of the client data center 110. In other embodiment of the present invention, the essentialness assessment module 130 classifies each IT component into a predefined level of essentialness, such as "essential" wherein a dataset is necessary for an associated service, "valuable" wherein the dataset may improve efficiency of the associated service if transferred but the associated service can be performed without the dataset being transferred, and "non-essential" wherein the transfer of the dataset does not impact the associated service in any way.

The essentialness assessment module 130 may obtains information for assessment from various sources such as human input, existing application metadata, best practices from known application patterns, and data requirements specific to respective value-added services, etc. Examples of the human input may be, but are not limited to, manual labeling by the client, etc. Example of the existing application metadata may be, but are not limited to, data dictionary, etc. Example of the best practices from known application patterns may be, but are not limited to, Apache Hadoop® name node and a quorum of data nodes, etc. (Apache Hadoop is a registered trademark of the Apache Software Foundation.) Example of the data requirements specific to respective value-added services may be, but are not limited to, data requirement of virus scan service, data requirement of compressibility estimation service, etc.

The policy configuration module 140 enables the client and/or the administrator of the DRaaS service provider 190 to configure and specify backup policies by use of the essentialness score/classification assigned to each IT component of the client data center 110, for respective services. An exemplary policy may be "to replicate essential components first; to replicate valuable components when there is no traffic on the network; and not to replicate non-essential components". The policy may be represented in any textual formats such as JavaScript Object Notation (JSON) and Extensible Markup Language (XML). (JavaScript is a trademark of Oracle Corporation) The administrator of the DRaaS service provider 190 and/or the client operating the client data center may modify, revise, and revoke policies according to needs and circumstances.

In block 230, the DRaaS service provider 190 detects that the DRaaS service is enabled by both the client and the administrator of the DRaaS service provider 190, and accordingly, replicates the dataset from the client data center to the target site, pursuant to the assessed essentialness score and the configured policy from block 220. Then the DRaaS service provider 190 proceeds with block 240.

In block 240, the DRaaS service provider 190 examines a request from the client. If the DRaaS service provider 190 determines that the request is made for a dataset recovery service, then the DRaaS service provider 190 proceeds with block 250. If the DRaaS service provider 190 determines that the request is made for a value-added service, then the DRaaS service provider 190 proceeds with block 260.

In block 250, the DRaaS service provider 190 recovers entire source site dataset by use of the replica 180 and by reconstructing source site dataset that had not been replicated in block 220. The dataset recovery service may be performed to recover from an actual disaster, or to test the DRaaS service provider 190. Then the DRaaS service provider 190 terminates one cycle of its process.

In block 260, the DRaaS service provider 190 performs a value-added service requested in block 240. Then the DRaaS service provider 190 terminates one cycle of its process.

Figure 3:
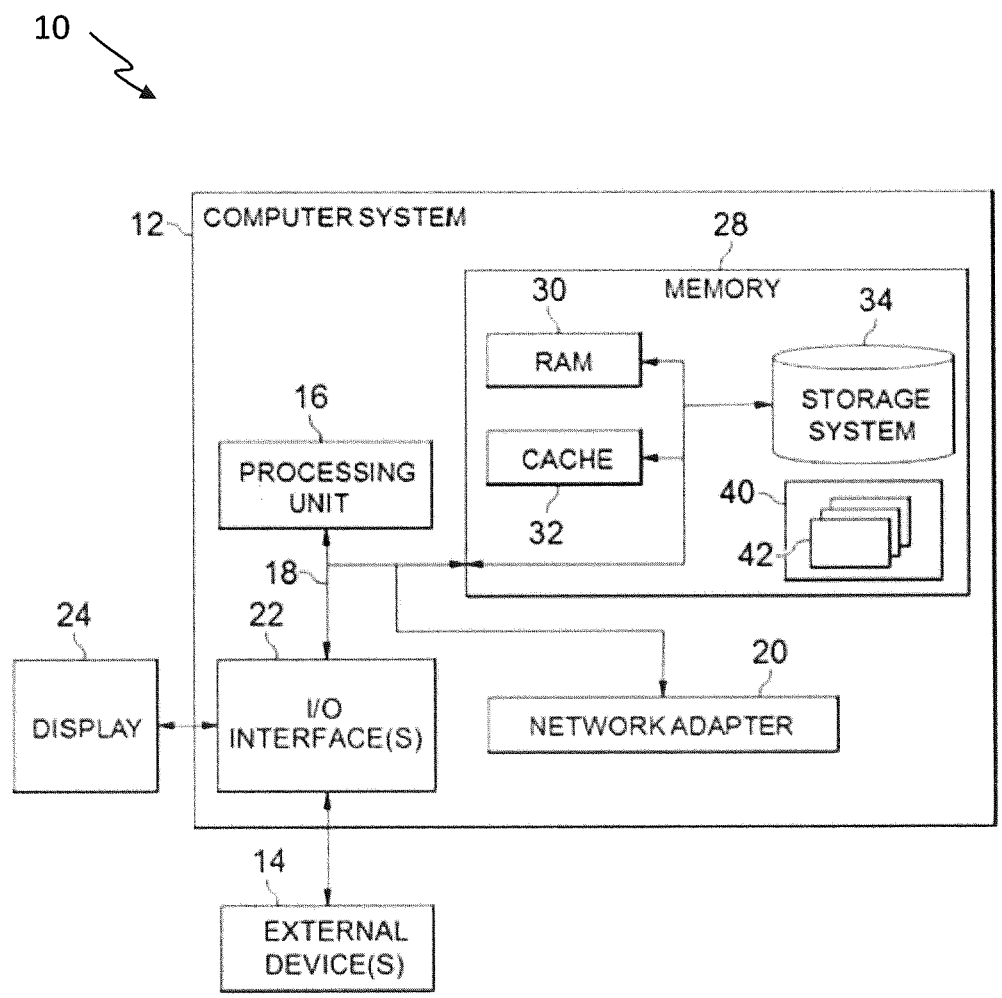
FIG. 3 depicts a cloud computing node according to an embodiment of the present invention.
Figure 4:
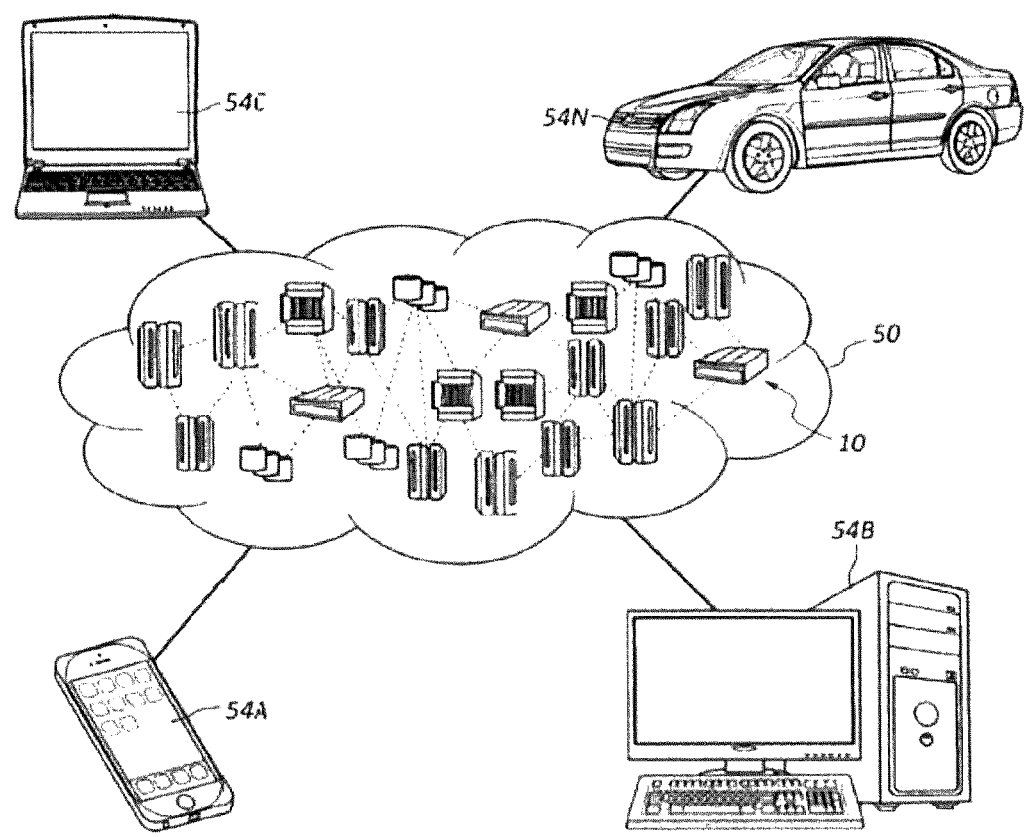
FIG. 4 depicts a cloud computing environment according to an embodiment of the present invention.
Figure 5:
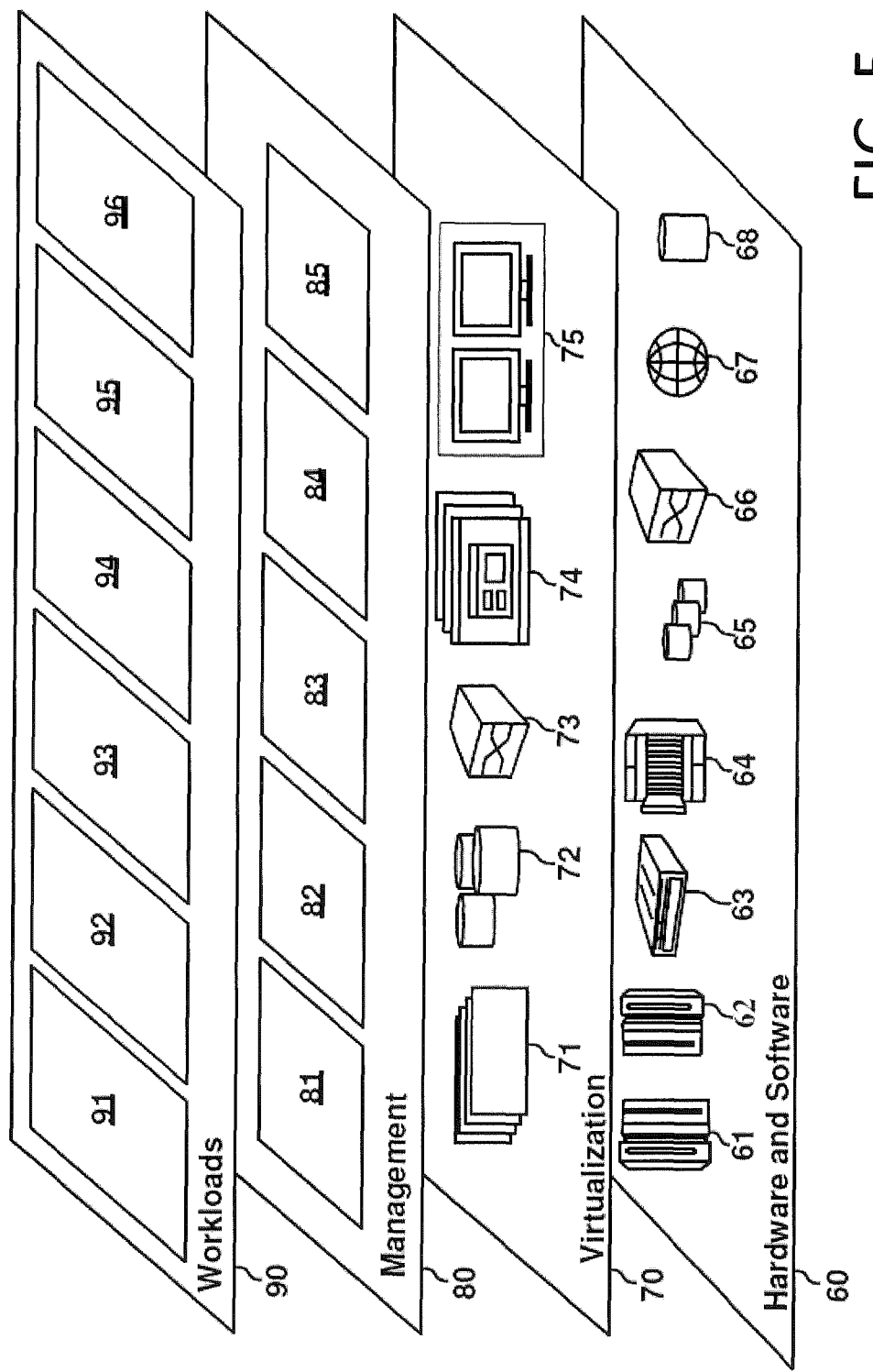
FIG. 5 depicts abstraction model layers provided by cloud computing environment according to an embodiment of the present invention.

FIGS. 3-5 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of an optimized Disaster-Recovery-as-a-Service (DRaaS) service provider. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and various processing components of a Disaster-Recovery-as-a-Service (DRaaS) service provider 96 as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method for optimizing a data protection service provider, comprising:
   obtaining, by the data protection service provider running on a computer of a target site, at least one value-added service, selected by use of a client agent running on another computer of a source site, for the data protection service provider to provide additional to a disaster recovery service for the source site, wherein the source site is a client data center originating client data being protected by the data protection service provider at the target site;
   identifying, by the data protection service provider, a first dataset comprising components from the client data of the source site, the first dataset being associated with a first service provided by the target site, the first service being in a group comprising the obtained at least one value-added service and the disaster recovery service;

analyzing, by the data protection service provider, the identified first dataset such that the data protection service provider is enabled to determine a policy corresponding to the first service, the policy dictating when and how to replicate the components of the identified first dataset from the source site to the target site in order to minimize cost of providing the first service for the source site, wherein the cost comprises network bandwidth and storage footprint, the network bandwidth being to replicate the identified first dataset from the source site to the target site, and the storage footprint being to maintain the identified first dataset in the target site;

upon detecting inputs enabling the first service, replicating, by the data protection service provider, from the source site to the target site, the components of the identified first dataset according to the policy determined from said analyzing; and performing, by the data protection service provider, the first service in the target site based on the replicated components of the first dataset.

2. The method of claim 1, said analyzing comprising:
determining that a first component of the identified first dataset is essential to the first service based on applying analytics data, comprising a manual label set by the client, best practice data, user dictionary data, to the identified first dataset, the first component being essential indicating that the first component is necessary for the target site to provide the first service, such that the policy is determined for the data protection service provider to replicate the first component with a highest priority and most frequently.

3. The method of claim 1, said analyzing comprising:
determining that a second component of the identified first dataset is valuable to the first service based on applying analytics data, comprising a manual label set by the client, best practice data, user dictionary data, to the identified first dataset, the second component being valuable indicating that the second component is not necessary but helpful for the target site to provide the first service, such that the policy is determined for the data protection service provider to replicate the second component if the network bandwidth is available.

4. The method of claim 1, said analyzing comprising:
determining that a third component of the identified first dataset is non-essential to the first service based on applying analytics data, comprising a manual label set by the client, best practice data, user dictionary data, to the identified first dataset, the third component being non-essential indicating that the third component does not contribute to the first service when present at the target site, such that the policy is determined for the data protection service provider not to replicate the third component to the target site.

5. The method of claim 1,
wherein the first service is the disaster recovery service for a database virtual machine of the source site,
wherein the first dataset comprises a data volume, a log volume, and an index volume of the database virtual machine,
wherein, from said analyzing, the data volume and the log volume are respectively determined to be essential for the disaster recovery service such that the policy is determined for the data protection service provider to replicate the data volume and the log volume from the source site to the target site, with a highest priority and most frequently, and wherein, from said analyzing, the index volume is determined to be valuable for the disaster recovery service such that the policy corresponding to the disaster recovery service is determined for the data protection service provider not to replicate the index volume from the source site to the target site when the network bandwidth is not available but to reconstruct the index volume at the target site by use of the replicated data volume and the replicated log volume.

6. The method of claim 1,
wherein the first service is a virus scanning service for a database virtual machine of the source site,
wherein the first dataset comprises a data volume, a log volume, and an index volume of the database virtual machine, and
wherein, from said analyzing, the data volume, the log volume, and the index volume are respectively determined to be essential for the virus scanning service such that the policy corresponding to the virus scanning service is determined for the data protection service provider to replicate the data volume, the log volume, and the index volume from the source site to the target site with a highest priority and most frequently.

7. The method of claim 1,
wherein the at least one value-added service available from the data protection service provider for the source site comprises a disaster recovery test service, a virus scanning service, an eDiscovery service, a compressibility estimation service.

8. A computer program product comprising:
a computer readable storage medium readable by one or more processor and storing instructions for execution by the one or more processor for performing a method for optimizing a data protection service provider, comprising:

obtaining, by the data protection service provider running on a computer of a target site, at least one value-added service, selected by use of a client agent running on another computer of a source site, for the data protection service provider to provide additional to a disaster recovery service for the source site, wherein the source site is a client data center originating client data being protected by the data protection service provider at the target site;

identifying, by the data protection service provider, a first dataset comprising components from the client data of the source cite, the first dataset being associated with a first service provided by the target site, the first service being in a group comprising the obtained at least one value-added service and the disaster recovery service;

analyzing, by the data protection service provider, the identified first dataset such that the data protection service provider is enabled to determine a policy corresponding to the first service, the policy dictating when and how to replicate the components of the identified first dataset from the source site to the target site in order to minimize cost of providing the first service for the source site, wherein the cost comprises network bandwidth and storage footprint, the network bandwidth being to replicate the identified first dataset from the source site to the target site, and the storage footprint being to maintain the identified first dataset in the target site;

upon detecting inputs enabling the first service, replicating, by the data protection service provider, from the source site to the target site, the components of the identified first dataset according to the policy determined from said analyzing; and performing, by the data protection service provider, the first service in the target site based on the replicated components of the first dataset.

9. The computer program product of claim 8, said analyzing comprising:

determining that a first component of the identified first dataset is essential to the first service based on applying analytics data, comprising a manual label set by the client, best practice data, user dictionary data, to the identified first dataset, the first component being essential indicating that the first component is necessary for the target site to provide the first service, such that the policy is determined for the data protection service provider to replicate the first component with a highest priority and most frequently.

10. The computer program product of claim 8, said analyzing comprising:

determining that a second component of the identified first dataset is valuable to the first service based on applying analytics data, comprising a manual label set by the client, best practice data, user dictionary data, to the identified first dataset, the second component being valuable indicating that the second component is not necessary but helpful for the target site to provide the first service, such that the policy is determined for the data protection service provider to replicate the second component if the network bandwidth is available.

11. The computer program product of claim 8, said analyzing comprising:

determining that a third component of the identified first dataset is non-essential to the first service based on applying analytics data, comprising a manual label set by the client, best practice data, user dictionary data, to the identified first dataset, the third component being non-essential indicating that the third component does not contribute to the first service when present at the target site, such that the policy is determined for the data protection service provider not to replicate the third component to the target site.

12. The computer program product of claim 8, wherein the first service is the disaster recovery service for a database virtual machine of the source site, wherein the first dataset comprises a data volume, a log volume, and an index volume of the database virtual machine, wherein, from said analyzing, the data volume and the log volume are respectively determined to be essential for the disaster recovery service such that the policy is determined for the data protection service provider to replicate the data volume and the log volume from the source site to the target site, with a highest priority and most frequently, and wherein, from said analyzing, the index volume is determined to be valuable for the disaster recovery service such that the policy corresponding to the disaster recovery service is determined for the data protection service provider not to replicate the index volume from the source site to the target site when the network bandwidth is not available but to reconstruct the index volume at the target site by use of the replicated data volume and the replicated log volume.

13. The computer program product of claim 8, wherein the first service is a virus scanning service for a database virtual machine of the source site, wherein the first dataset comprises a data volume, a log volume, and an index volume of the database virtual machine, and wherein, from said analyzing, the data volume, the log volume, and the index volume are respectively determined to be essential for the virus scanning service such that the policy corresponding to the virus scanning service is determined for the data protection service provider to replicate the data volume, the log volume, and the index volume from the source site to the target site with a highest priority and most frequently.

14. The computer program product of claim 8, wherein the at least one value-added service available from the data protection service provider for the source site comprises a disaster recovery test service, a virus scanning service, an eDiscovery service, a compressibility estimation service.

15. A system comprising:

a memory;

one or more processor in communication with the memory; and program instructions executable by the one or more processor via the memory to perform a method for optimizing a data protection service provider, comprising:

obtaining, by the data protection service provider running on a computer of a target site, at least one value-added service, selected by use of a client agent running on another computer of a source site, for the data protection service provider to provide additional to a disaster recovery service for the source site, wherein the source site is a client data center originating client data being protected by the data protection service provider at the target site;

identifying, by the data protection service provider, a first dataset comprising components from the client data of the source site, the first dataset being associated with a first service provided by the target site, the first service being in a group comprising the obtained at least one value-added service and the disaster recovery service;

analyzing, by the data protection service provider, the identified first dataset such that the data protection service provider is enabled to determine a policy corresponding to the first service, the policy dictating when and how to replicate the components of the identified first dataset from the source site to the target site in order to minimize cost of providing the first service for the source site, wherein the cost comprises network bandwidth and storage footprint, the network bandwidth being to replicate the identified first dataset from the source site to the target site, and the storage footprint being to maintain the identified first dataset in the target site;

upon detecting inputs enabling the first service, replicating, by the data protection service provider, from the source site to the target site, the components of the identified first dataset according to the policy determined from said analyzing; and performing, by the data protection service provider, the first service in the target site based on the replicated components of the first dataset.

16. The system of claim 15, said analyzing comprising:

determining that a first component of the identified dataset is essential to the first service based on applying analytics data, comprising a manual label set by the client, best practice data, user dictionary data, to the identified first dataset, the first component being essential indicating that the first component is necessary for the target site to provide the first service, such that the policy is determined for the data protection service provider to replicate the first component with a highest priority and most frequently, wherein the at least one value-added service available from the data protection service provider for the source site comprises a disaster recovery test service, a virus scanning service, an eDiscovery service, a compressibility estimation service.

17. The system of claim 15, said analyzing comprising:
determining that a second component of the identified first dataset is valuable to the first service based on applying analytics data, comprising a manual label set by the client, best practice data, user dictionary data, to the identified first dataset, the second component being valuable indicating that the second component is not necessary but helpful for the target site to provide the first service, such that the policy is determined for the data protection service provider to replicate the second component if the network bandwidth is available, wherein the at least one value-added service available from the data protection service provider for the source site comprises a disaster recovery test service, a virus scanning service, an eDiscovery service, a compressibility estimation service.

18. The system of claim 15, said analyzing comprising:
determining that a third component of the identified first dataset is non-essential to the first service based on applying analytics data, comprising a manual label set by the client, best practice data, user dictionary data, to the identified first dataset, the third component being non-essential indicating that the third component does not contribute to the first service when present at the target site, such that the policy is determined for the data protection service provider not to replicate the third component to the target site pursuant to the policy, wherein the at least one value-added service available from the data protection service provider for the source site comprises a disaster recovery test service, a virus scanning service, an eDiscovery service, a compressibility estimation service.

19. The system of claim 15,
wherein the first service is the disaster recovery service for a database virtual machine of the source site,
wherein the first dataset comprises a data volume, a log volume, and an index volume of the database virtual machine,
wherein, from said analyzing, the data volume and the log volume are respectively determined to be essential for the disaster recovery service such that the policy corresponding to the disaster recovery service is determined for the data protection service provider to replicate the data volume and the log volume from the source site to the target site, with a highest priority and most frequently, and
wherein, from said analyzing, the index volume is determined to be valuable for the disaster recovery service such that the policy corresponding to the disaster recovery service is determined for the data protection service provider not to replicate the index volume from the source site to the target site when the network bandwidth is not available but to reconstruct the index volume by use of the replicated data volume and the replicated log volume.

20. The system of claim 15,
wherein the first service is a virus scanning service for a database virtual machine of the source site,
wherein the first dataset comprises a data volume, a log volume, and an index volume of the database virtual machine, and
wherein, from said analyzing, the data volume, the log volume, and the index volume are respectively determined to be essential for the virus scanning service such that the policy corresponding to the virus scanning service is determined for the data protection service provider to replicate the data volume, the log volume, and the index volume from the source site to the target site with a highest priority and most frequently.

\* \* \* \* \*